United States Patent
Mueller-Fischer et al.

(10) Patent No.: US 9,613,449 B2
(45) Date of Patent: Apr. 4, 2017

(54) METHOD AND APPARATUS FOR SIMULATING STIFF STACKS

(71) Applicant: NVIDIA Corporation, Santa Clara, CA (US)

(72) Inventors: Matthias Mueller-Fischer, Uerikon (CH); Miles Macklin, Freemans Bay (NZ)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 14/145,826

(22) Filed: Dec. 31, 2013

(65) Prior Publication Data

US 2015/0109289 A1    Apr. 23, 2015

Related U.S. Application Data

(60) Provisional application No. 61/893,067, filed on Oct. 18, 2013.

(51) Int. Cl.
*G06T 15/00* (2011.01)
*G06T 13/20* (2011.01)

(52) U.S. Cl.
CPC .......... *G06T 13/20* (2013.01); *G06T 2210/16* (2013.01); *G06T 2210/24* (2013.01); *G06T 2210/52* (2013.01); *G06T 2210/56* (2013.01)

(58) Field of Classification Search
CPC . G06T 13/20; G06T 17/10; G06T 2219/2016; G06T 2210/52; G06T 3/40
USPC .......... 345/419, 420, 473, 474, 475
See application file for complete search history.

(56) References Cited

U.S. PATENT DOCUMENTS

| | | |
|---|---|---|
| 5,953,239 A | 9/1999 | Teixeira et al. |
| 6,815,245 B2 | 11/2004 | Xu et al. |
| 7,091,973 B1 | 8/2006 | Cohen |
| 7,191,191 B2 | 3/2007 | Peurach et al. |
| 7,212,656 B2 | 5/2007 | Liu et al. |
| 7,372,463 B2 | 5/2008 | Anand |
| 7,542,040 B2 | 6/2009 | Templeman |
| 7,643,685 B2 | 1/2010 | Miller |

(Continued)

OTHER PUBLICATIONS

Miklos, Real-Time Fluid Simulation Using Height Fields, Swiss Federal Institute of technology Zurich, Master Thesis, Summer 2004, pp. 1-42.*

(Continued)

*Primary Examiner* — Phu K Nguyen

(57) ABSTRACT

A computer implemented method of simulating a stack of objects represented as data within memory of a computer system is disclosed. The method comprises modeling the stack within a computer simulation as a set of associated primitives with associated constraints thereto in the memory, wherein the stack comprises a plurality of layers and wherein each layer comprises at least one primitive. The method further comprises estimating a height for each of the primitives in the stack and determining a respective scaling factor for each of the primitives in parallel, wherein each scaling factor is operable to adjust a mass value of each of the primitives. Also, the method comprises scaling a mass value of each of the primitives in accordance with a respective scaling factor in parallel. Finally, the method comprises solving over a plurality of constraints iteratively using a scaled mass value for each of the primitives.

20 Claims, 17 Drawing Sheets

(56) References Cited

U.S. PATENT DOCUMENTS

| | | | |
|---|---|---|---|
| 7,731,588 | B2 | 6/2010 | Templeman |
| 7,895,411 | B2 | 2/2011 | Maher et al. |
| 7,921,003 | B2 * | 4/2011 | Miller et al. .................. 703/9 |
| 7,948,485 | B1 | 5/2011 | Larsen et al. |
| 8,186,913 | B2 * | 5/2012 | Toner et al. ................ 406/92 |
| 8,269,778 | B1 | 9/2012 | Baraff et al. |
| 8,327,388 | B2 | 12/2012 | Muller et al. |
| 8,386,225 | B2 | 2/2013 | Bourbiaux |
| 8,803,887 | B2 | 8/2014 | McAdams et al. |
| 8,807,879 | B2 * | 8/2014 | Toner et al. ............... 406/197 |
| 8,810,590 | B2 | 8/2014 | Oat et al. |
| 8,878,856 | B1 * | 11/2014 | Chentanez et al. .......... 345/473 |
| 8,903,693 | B2 | 12/2014 | McDaniel et al. |
| 8,930,969 | B2 | 1/2015 | Muller-Fischer et al. |
| 8,941,826 | B2 * | 1/2015 | Nawaz et al. ............... 356/246 |
| 9,037,440 | B2 * | 5/2015 | Sun et al. .................... 703/2 |
| 9,070,221 | B1 | 6/2015 | Soares |
| 2002/0149622 | A1 | 10/2002 | Uesaki et al. |
| 2006/0085088 | A1 | 4/2006 | Nakayama et al. |
| 2007/0085851 | A1 | 4/2007 | Muller et al. |
| 2010/0214313 | A1 | 8/2010 | Herman et al. |
| 2010/0235769 | A1 | 9/2010 | Young et al. |
| 2015/0109309 | A1 | 4/2015 | Mueller-Fischer et al. |
| 2015/0161810 | A1 | 6/2015 | Macklin et al. |

OTHER PUBLICATIONS

Bodin, et al., Constraint Fluids, IEEE Transactions of Visualization and Computer Graphics, Mar. 2012, vol. 18.

Clavet, et al., Particle-based Viscoelastic Fluid Simulation, Eurographics/ ACM SIGGRAPH Symposium on Computer Animation, 2005. The Eurographics Association 2005. LIGUM, Dept. IRO, Univerite de Montreal.

Macklin, et al., Position Based Fluids, ACM Transactions on Graphics, vol. 32, Issue 4.

Monaghan, Smoothed particle hydrodynamics, Reports on Progress in Physics, 2005, 1703-1759, vol. 68, Institute of Physics Publishing.

Monaghan, SPH without a Tensile Instability, Journal of Computational Physics, 2000, 290-311, vol. 159, Academic Press.

Muller, et al., Position Based Dynamics, 3rd Workshop in Virtual Reality Interactions and Physical Simulation "VRIPHYS", 2006.

Fedkiw et al., "Visual Simulation of Smoke", Proceedings of the 28th Annual Conference on Computer Graphics and Interactive Techniques, ACM, 2001.

\* cited by examiner

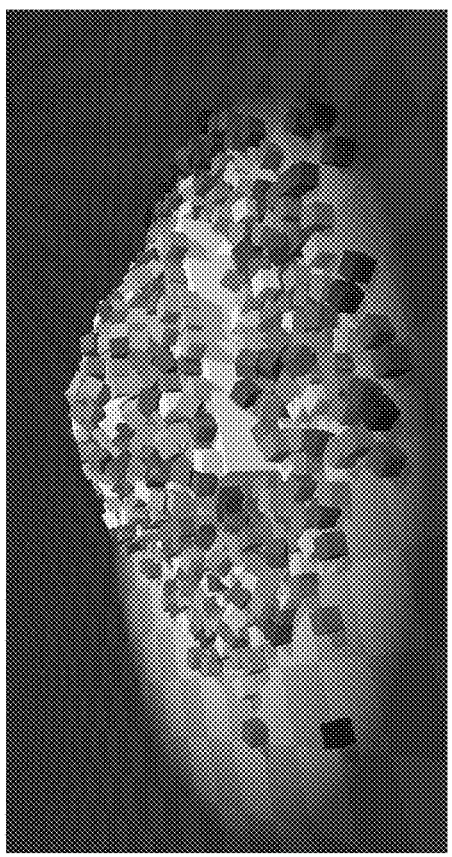
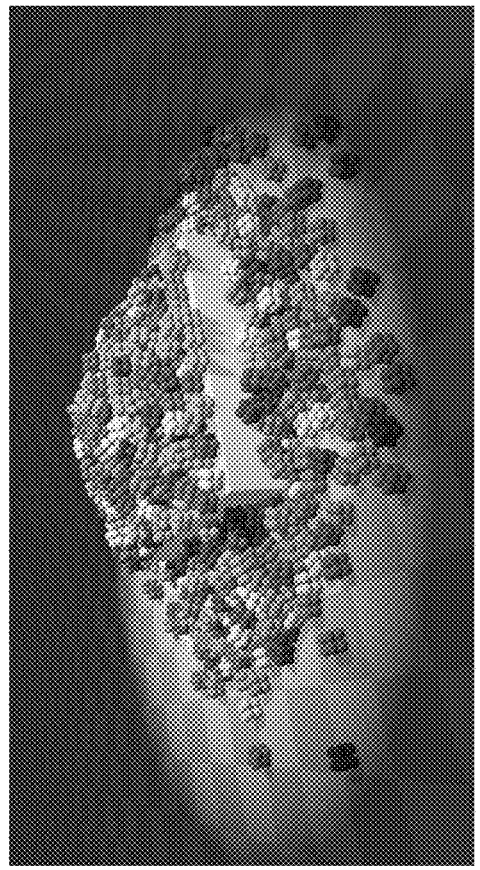
FIG. 4A
FIG. 4B

```
struct Particle
{
    float3 x;
    float3 v;
    float invmass;
660 ──────▶int phase;
};
```

FIG. 6

Figure 1: *A particle constrained to lie at the origin by two identical distance constraints*

Algorithm 1 Particle-Centric Solve (gather)
---
1: for all particles $i$ in parallel do
2:    initialize position delta $\Delta x_i = 0$
3:    for all constraint $c$ affecting $i$ do
4:       calculate constraint error and gradient $\lambda_c$
5:       update delta $\Delta x_i += \lambda_c \Delta C_i$
6:    end for
7:    update particle $x_i$
8: end for

FIG. 8A

Algorithm 2 Constraint-Centric Solve (scatter)
---
1: for all particles $i$ in parallel do
2:    initialize position delta $\Delta x_i = 0$
3: end for
4: for all constraints $c$ in parallel do
5:    calculate constraint error $\lambda_c$
6:    for all particles $i$ do
7:       calculate constraint gradient $\Delta C_i$
8:       atomically update particle delta $\Delta x_i += \lambda_c \Delta C_i$
9:    end for
10: end for

FIG. 8B

Algorithm 3 Simulation Loop

1: for all particles $i$ do
2:     apply forces $v_i \Leftarrow v_i + \Delta t f_{ext}(x_i)$
3:     predict position $x_i^* \Leftarrow x_i + \Delta t v_i$
4:     apply mass scaling $m_i^* = m_i e^{-kh(x_i^*)}$
5: end for
6: for all particles $i$ do
7:     find neighboring particles $N_i(x_i^*)$
8: end for
9: while *iter < solverIterations* do
10:     solve density constraints
11:     solve rigid constraints
12:     solve distance constraints
13:     solve pressure constraints
14:     solve contact constraints
15: end while
16: for all particles $i$ do
17:     update velocity $v_i \Leftarrow \frac{1}{\Delta t}(x_i^* - x_i)$
18:     apply viscosity, vorticity confinement and dissipation
19: end for

METHOD AND APPARATUS FOR SIMULATING STIFF STACKS

CROSS-REFERENCE TO RELATED APPLICATIONS

This application is a conversion of and claims priority to and the benefit of Provisional Patent Application No. 61/893,067, entitled "CONTINUOUS SHOCK PROPAGATION," having a filing Date of Oct. 18, 2013, which is herein incorporated by reference in its entirety.

The present application is related to U.S. patent application Ser. No. 14/102,323, filed Dec. 10, 2013, entitled "POSITION BASED FLUID DYNAMICS SIMULATION," naming Miles Macklin and Matthias Müller as inventors. That application is incorporated herein by reference in its entirety and for all purposes.

The present application is related to U.S. patent application Ser. No. 14/145,840, filed Dec. 31, 2013, entitled "UNIFIED POSITION BASED SOLVER FOR VISUAL EFFECTS," naming Matthias Müller-Fischer and Miles Macklin as inventors. That application is incorporated herein by reference in its entirety and for all purposes.

FIELD OF THE INVENTION

Embodiments according to the present invention generally relate to graphics processing units (GPUs) and more specifically to rendering computer graphics using GPUs.

BACKGROUND OF THE INVENTION

The field of physically based animation in computer graphics involves simulation of physical phenomenon such as the dynamics of rigid bodies, clothing, deformable objects or fluid flow.

One conventional approach has been to simulate dynamic objects by computing forces acting on an object over time steps. At the beginning of each time step, internal and external forces are accumulated. Examples of internal forces are elastic forces in deformable objects or viscosity and pressure forces in fluids. Gravity and collision are examples of external forces. It is well known that Newton's second law of motion relates forces to accelerations via the mass. Using the density or lumped masses of vertices, the forces can then be transformed into acceleration values. Subsequently, any time integration scheme can be used to first compute the velocities from the accelerations and then the positions from the velocities. Some approaches alternatively use impulses instead of forces to control the animation.

Another conventional approach to simulating dynamic objects involves using position based dynamics. A position based approach eliminates the velocity layer and immediately works on the positions. In computer graphics and especially in computer games, it is often desirable to have direct control over positions of objects or vertices of a mesh. The user may want to attach a vertex to a kinematic object or ensure the vertex always stay outside a colliding object. In such cases, it is beneficial to have an approach that works directly on the positions of objects, which makes such manipulations more efficient. In addition, with the position based approach it is possible to control the integration directly, thereby, avoiding overshooting and energy gain problems in connection with explicit integration.

Software-based constraint solvers are typically used in simulation systems, (position-based or otherwise) to ensure that the dynamic objects being simulated satisfy a series of predefined physical constraints. Visual effects are typically built using a combination of different physics solvers, e.g., a solver for rigid bodies, a solver for fluids, a solver for clothing etc. One shortcoming of implementing conventional solvers, e.g., solvers for rigid bodies is that stable stacking of rigid bodies can be computationally intensive for real-time applications. This is in large part due to the large number of iterations required to propagate collision forces from the bottom of a stack to bodies at the top. As a result, stacks of simulated rigid bodies are either unstable or the computation time required for the solver to stabilize the stacks results in serious inefficiencies.

BRIEF SUMMARY OF THE INVENTION

Accordingly, a need exists for a constraint solver simulation tool that improves the stability of stacks of dynamic objects, e.g., rigid bodies, fluids, etc. without increasing the number of constraint iterations or changing the iteration order. Further, a need exists for a constraint solver that can perform the computations required for real-time stacking of objects efficiently and in parallel.

In one embodiment, the present invention allows the mass of the fundamental building blocks or primitives, e.g., particles, blocks, etc. of the dynamic object being simulated, e.g., rigid body, fluid, etc. to be characterized as a function of stack height and adjusted prior to constraint solving. The primitives at the bottom of the stack, for example, are weighted heavier than the primitives towards the top of the stack. This allows the stack to be more stable. Further, in one embodiment, the mass adjustment for all the building blocks or primitives can be carried out in parallel before solving constraints for all the building blocks in parallel. Accordingly, by carrying out the mass adjustment computations in parallel, the stability of the stacks can be improved efficiently without sacrificing computation time.

In one embodiment, a computer implemented method of simulating a stack of objects represented as data within memory of a computer system is disclosed. The method comprises modeling the stack within a computer simulation as a set of associated primitives with associated constraints thereto in the memory, wherein the stack comprises a plurality of layers and wherein each layer comprises at least one primitive. The method further comprises estimating a height for each of a plurality of primitives in the stack and determining a respective scaling factor for each of the plurality of primitives in parallel, wherein each scaling factor is operable to adjust a mass value of each of the plurality of primitives. Also, the method comprises scaling a mass value of each of the plurality of primitives in accordance with a respective scaling factor in parallel. Finally, the method comprises solving over a plurality of constraints iteratively using a scaled mass value for each of the plurality of primitives.

In one embodiment, a non-transitory computer-readable storage medium having stored thereon, computer executable instructions that, if executed by a computer system cause the computer system to perform a method of simulating a stack of objects represented within memory of a computer system is disclosed. The method comprises modeling the stack within a computer simulation as a set of associated primitives with associated constraints thereto in the memory, wherein the stack comprises a plurality of layers and wherein each layer comprises at least one primitive. The method further comprises estimating a height for each of a plurality of primitives in the stack and determining a respective scaling factor for each of the plurality of primitives in parallel, wherein each scaling factor is operable to adjust a mass value of each of the plurality of primitives. Also, the method comprises scaling a mass value of each of the plurality of primitives in accordance with a respective scaling factor in parallel. Finally, the method comprises solving over a plurality of constraints iteratively using a scaled mass value for each of the plurality of primitives.

In one embodiment, a system for simulating a stack of objects is disclosed. The system comprises a memory storing information related to a constraint solver and a processor coupled to the memory, the processor operable to implement a method of simulating a stack of objects. The method comprises modeling the stack within a computer simulation as a set of associated primitives with associated constraints thereto in the memory, wherein the stack comprises a plurality of layers and wherein each layer comprises at least one primitive. The method further comprises estimating a height for each of a plurality of primitives in the stack and determining a respective scaling factor for each of the plurality of primitives in parallel, wherein each scaling factor is operable to adjust a mass value of each of the plurality of primitives. Also, the method comprises scaling a mass value of each of the plurality of primitives in accordance with a respective scaling factor in parallel. Finally, the method comprises solving over a plurality of constraints iteratively using a scaled mass value for each of the plurality of primitives.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 4A illustrates an exemplary simulation scenario where certain rigid bodies are piled together.

FIG. 4B illustrates a particle view of the rigid bodies from FIG. 4A in accordance with embodiments of the invention.

FIG. 6 illustrates the state that each particle in a system can comprise in accordance with embodiments of the invention.

FIG. 8A illustrates an exemplary procedure for solving constraints in a particle-centric way in accordance with embodiments of the present invention FIG. 8B illustrates an exemplary procedure for solving constraints in a constraint-centric manner in accordance with embodiments of the present invention.

FIG. 9 illustrates an exemplary procedure for a unified solver to simulate visual effects using particles as building blocks in accordance with embodiments of the invention.

Figure 1:
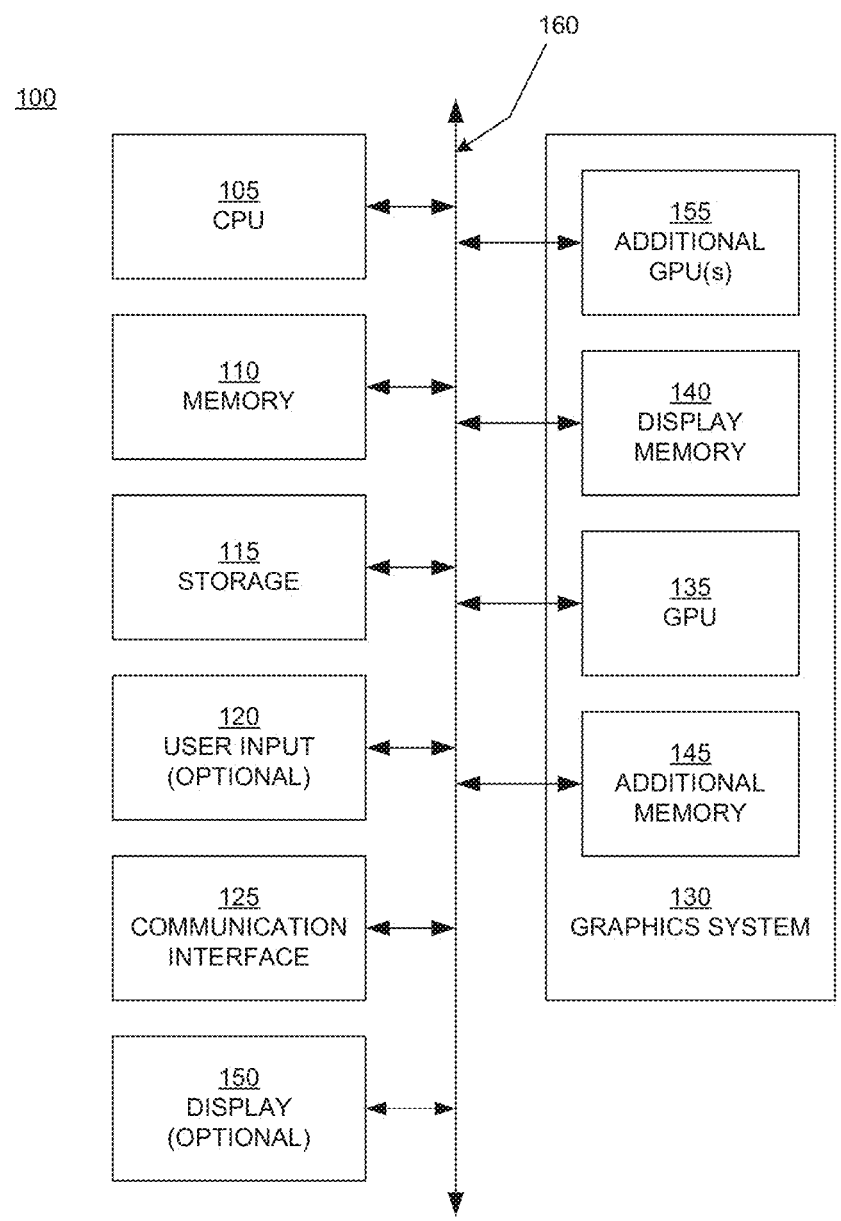
FIG. 1 is a block diagram of an example of a computing system capable of implementing embodiments according to the present invention.

In the figures, elements having the same designation have the same or similar function.

DETAILED DESCRIPTION OF THE INVENTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follows are presented and discussed in terms of a process or method. Although steps and sequencing thereof are disclosed in figures (e.g. FIG. 17) herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "modeling," "estimating," "determining," "scaling," "solving," "adjusting," "predicting," "finding," "solving," "updating," "determining," and "applying," "identifying," or the like, refer to actions and processes of a computer system (e.g., flowchart 1750 of FIG. 17) or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

Further, while embodiments described herein may make reference to a GPU, it is to be understood that the circuits and/or functionality described herein could also be implemented in other types of processors, such as general-purpose or other special-purpose coprocessors, or within a CPU.

FIG. 1 is a block diagram of an example of a computer system 100 capable of implementing embodiments according to the present invention. In one embodiment, an application server as described herein may be implemented on exemplary computer system 100.

In the example of FIG. 1, the computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones.

The communication or network interface 125 allows the computer system 100 to communicate with other computer systems via an electronic communications network, including wired and/or wireless communication and including an Intranet or the Internet. In one embodiment, the computer system 100 receives instructions and user inputs from a remote computer through communication interface 125. Communication interface 125 can comprise a transmitter and receiver for communicating with remote devices.

The optional display device 150 may be any device capable of displaying visual information in response to a signal from the computer system 100.

The components of the computer system 100, including the CPU 105, memory 110, data storage 115, user input devices 120, communication interface 125, and the display device 150, may be coupled via one or more data buses 160.

In the embodiment of FIG. 1, a graphics system 130 may be coupled with the data bus 160 and the components of the computer system 100. The graphics system 130 may include a physical graphics processing unit (GPU) 135 and graphics memory. The GPU 135 generates pixel data for output images from rendering commands.

The physical GPU 135 can be configured as multiple virtual GPUs that may be used in parallel (concurrently) by a number of applications or processes executing in parallel. For example, mass scaling processes for rigid bodies or a variety of constraint solving processes may be run in parallel on the multiple virtual GPUs.

Graphics memory may include a display memory 140 (e.g., a framebuffer) used for storing pixel data for each pixel of an output image. In another embodiment, the display memory 140 and/or additional memory 145 may be part of the memory 110 and may be shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 may be adapted to operate in parallel with the GPU 135. Each additional GPU 155 generates pixel data for output images from rendering commands. Each additional physical GPU 155 can be configured as multiple virtual GPUs that may be used in parallel (concurrently) by a number of applications or processes executing in parallel, e.g. processes that solve constraints. Each additional GPU 155 can operate in conjunction with the GPU 135, for example, to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately coupled with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2:
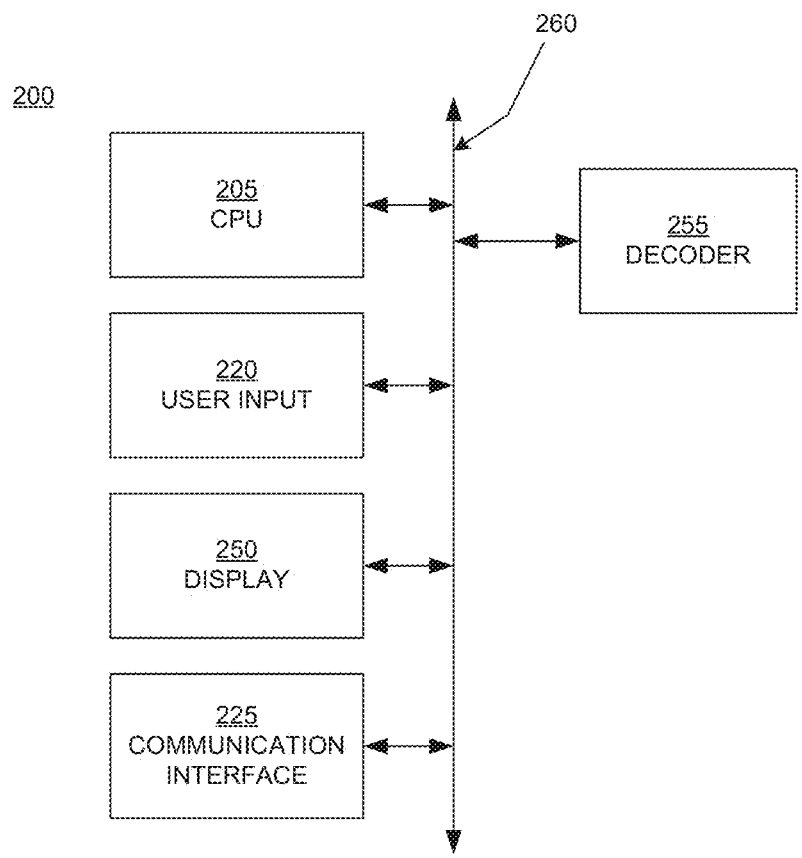
FIG. 2 is a block diagram of an example of an end user or client device capable of implementing embodiments according to the present invention.

FIG. 2 is a block diagram of an example of an end user or client device 200 capable of implementing embodiments according to the present invention. In the example of FIG. 2, the client device 200 includes a CPU 205 for running software applications and optionally an operating system. The user input 220 includes devices that communicate user inputs from one or more users and may include keyboards, mice, joysticks, touch screens, and/or microphones. The communication interface 225 allows the client device 200 to communicate with other computer systems (e.g., the computing system 100 of FIG. 1) via an electronic communications network, including wired and/or wireless communication and including the Internet.

The decoder 255 may be any device capable of decoding (decompressing) data that may be encoded (compressed). For example, the decoder 255 may be an H.264 decoder. The display device 250 may be any device capable of displaying visual information, including information received from the decoder 255. In particular, as will be described below, the display device 250 may be used to display visual information received from the computing system 100. The components of the client device 200 may be coupled via one or more data buses 260.

Relative to the computing system 100, the client device 200 in the example of FIG. 2 may have fewer components and less functionality and, as such, may be referred to as a thin client. However, the client device 200 may include other components including those described above. In general, the client device 200 may be any type of device that has display capability, the capability to decode (decompress) data, and the capability to receive inputs from a user and send such inputs to the computing system 100. However, the client device 200 may have additional capabilities beyond those just mentioned. The client device 200 may be, for example, a personal computer, a tablet computer, a mobile device, a gaming console, a television, or the like.

Figure 3:
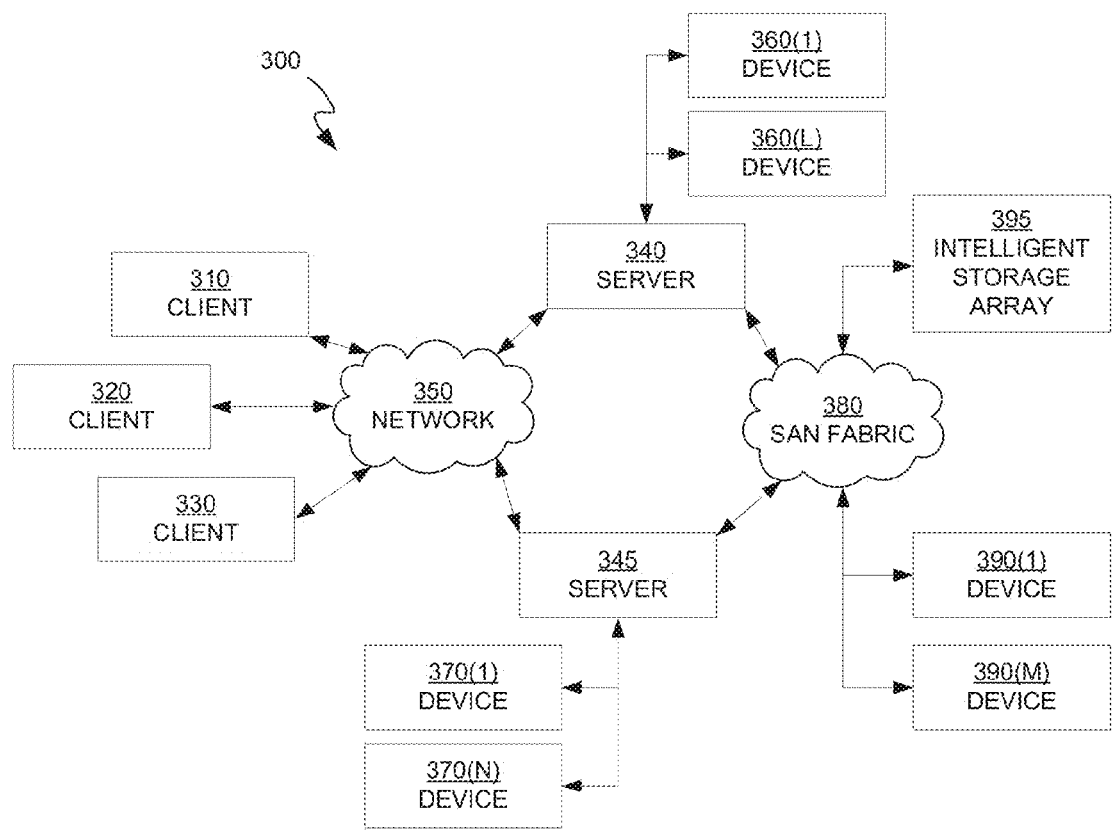
FIG. 3 is a block diagram of an example of a network architecture in which client systems and servers may be coupled to a network.

FIG. 3 is a block diagram of an example of a network architecture 300 in which client systems 310, 320, and 330 and servers 340 and 345 may be coupled to a network 350. Client systems 310, 320, and 330 generally represent any type or form of computing device or system, such as computing system 100 of FIG. 1.

Similarly, servers 340 and 345 generally represent computing devices or systems, such as application servers or database servers, configured to provide various database services and/or run certain software applications. Network 350 generally represents any telecommunication or computer network including, for example, an intranet, a wide area network (WAN), a local area network (LAN), a personal area network (PAN), or the Internet.

With reference to computing system 100 of FIG. 1, a communication interface, such as communication interface 122, may be used to provide connectivity between each client system 310, 320, and 330 and network 350. Client systems 310, 320, and 330 may be able to access information on server 340 or 345 using, for example, a Web browser or other client software. Such software may allow client systems 310, 320, and 330 to access data hosted by server 340, server 345, storage devices 360(1)-(L), storage devices 370(1)-(N), storage devices 390(1)-(M), or intelligent storage array 395. Although FIG. 3 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 340, server 345, storage devices 360(1)-(L), storage devices 370(1)-(N), storage devices 390(1)-(M), intelligent storage array 395, or any combination thereof. All or a portion of one or more of the example embodiments disclosed herein may also be encoded as a computer program, stored in server 340, run by server 345, and distributed to client systems 310, 320, and 330 over network 350.

Method and Apparatus for Simulating Stiff Stacks

Embodiments of the present invention provide for a constraint solver that improves the stability of stacks of dynamic objects, e.g., rigid bodies, fluids, etc. without increasing the number of constraint iterations or changing the iteration order. Further, embodiments of the present invention provide for a constraint solver that can perform the computations required for real-time stacking of objects efficiently and in parallel.

In one embodiment, the present invention allows the mass of the fundamental building blocks or primitives, e.g., particles, blocks, etc. of the dynamic object being simulated, e.g., rigid body, fluid, etc. to be characterized as a function of stack height and adjusted prior to constraint solving. The primitives at the bottom of the stack, for example, could be weighted heavier than the primitives towards the top of the stack. This allows the stack to be more stable. Further, in one embodiment, the mass adjustment for all the building blocks or primitives can be carried out in parallel before solving constraints for all the building blocks in parallel. Accordingly, by carrying out the mass adjustment computations in parallel, the stability of the stacks can be improved efficiently without sacrificing computation time. In one embodiment, the mass scaling operations can be conducted in parallel on a processor, e.g., a graphics processing unit (GPU), wherein each primitive is scaled in a separate thread on the GPU in parallel with the other primitives. Accordingly, the solver of the present invention is fully parallel making it efficient for GPU architectures.

In contrast to conventional solvers, which require several constraint iterations in order to make stacks of rigid bodies stable, embodiments of the present invention perform a mass scaling operation on the building blocks of the stacks in parallel on a GPU architecture to converge to improve the stability of simulated stacks In one embodiment, the constraint solver with functionality for improving the stability of stacks can be implemented as a unified constraint solver that models several different types of materials and objects, e.g., rigid bodies, clothing, liquids etc. using a single general-purpose framework. In another embodiment, the constraint solver of the present invention can be implemented as a unified constraint solver that allows two-way coupling between the different types of objects and materials, e.g., rigid bodies, soft-bodies, granular materials, liquids, gases, etc. Further, in one embodiment, the unified solver system is designed to take advantage of parallel architectures such as GPUs, wherein different sets of constraints can be solved in a parallel fashion.

Particle Representation

In one embodiment, the present invention is a parallel, particle-based solver for simulating effects including rigid bodies, granular materials, fluids, clothing, and ropes. The unified constraint solver of the present invention, in one embodiment, can comprise different types of constraints e.g., closing constraints, distance constraints, pressure and density constraints etc. within one system. Further, the way that shapes are described also needs to be unified in order for different types of objects and materials to be modeled using the same general purpose framework. Accordingly, in one embodiment, particles are chosen as the fundamental building block to model all objects.

In conventional systems, when simulating a rigid body, e.g., a chair, a triangle mesh or a convex hull would be chosen to model the chair, but such representations are not naturally applied to fluids, which change topology often. As stated above, in order to model different types of visual effects using a unified solver, the way that the visual effects are described need to be unified. Accordingly, in one embodiment of the present invention, the unified solver of the present invention uses spherical particles as the fundamental building block for all objects including rigid bodies. Further, it uses shape matching constraints to keep the particles rigidly locked together.

FIG. 4A illustrates an exemplary simulation scenario where certain rigid bodies are piled together. FIG. 4B illustrates a particle view of the rigid bodies from FIG. 4A in accordance with embodiments of the invention. As seen in FIG. 4B, the rigid bodies are represented using spherical particles in a departure from conventional methods which would use triangle meshes or convex hulls. Further, the particles are held together using shape matching constraints in order to create the visual effect of rigid bodies piled together as shown in FIG. 4A. For example, to model a chair, particles can be used to model the legs of the chair and shape matching constraints can be used to keep the particles in the legs of the chair rigidly locked to each other. Similarly, in order to model any object or material using a unified solver, a set of constraints is applied to a group of particles, wherein the set of constraints is tailored in accordance with the object or material that is being modeled. For example, the constraints to model a fluid would be different from the constraints applied to model a rigid body.

Figure 5:
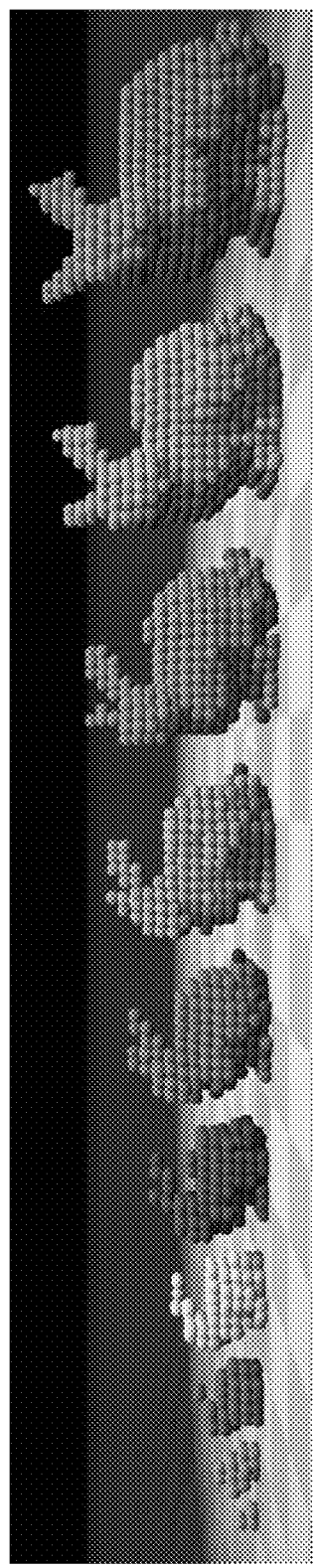
FIG. 5 illustrates an exemplary object, a bunny, for instance, at different sizes sampled by particles in accordance with embodiments of the invention.

FIG. 5 illustrates an exemplary object, a bunny, for instance, at different sizes sampled by particles in accordance with embodiments of the invention. As seen in FIG. 5, more particles are required to represent the larger sized bunnies than the smaller ones.

In one embodiment, large non-dynamic shapes such as walls and floors are represented by the unified solver of the present invention using conventional building blocks e.g., convex hulls, signed distance fields and triangle meshes. This is because particles can be an inefficient choice of collision primitive for large shapes.

In one embodiment of the present invention, the particles are restricted to a fixed radius per system in order to simplify collision detection and make collision handling efficient.

FIG. 6 illustrates the state that each particle in a system can comprise according to embodiments of the invention. The particle phase identifier 660 is an integer value that can be used to organize particles into groups. It can also be used to provide a convenient way to adjust the properties of the particles and control how they interact. By way of example, a phase identifier of 0 can be assigned to represent fluid particles. Phase identifiers, in one embodiment, can be used to prevent particles in different phases from generating collisions.

It should be noted, however, that in order to perform the mass scaling operation for improving the stability of stacked objects, as will be discussed in detail below, the fundamental building block of the object, e.g., a rigid body, fluid, etc. does not need to be a particle. Further, the mass scaling procedure can be used to stabilize stacks even in conventional rigid body specific solvers. In other words, the stack stabilizing method of the present invention is not specific to particle-based solvers, nor is it specific to unified solvers. For example, the mass scaling operation could be applied to a large non-dynamic shape such as a brick wall that uses boxes or triangle meshes within a conventional rigid body solver as primary building blocks as opposed to particles.

Parallel Successive Over-Relaxation (SOR) Solver

One drawback of prior art systems, as mentioned above, is that each constraint is solved serially. It will be appreciated by one having ordinary skill in the art that position based dynamics solves a system of non-linear constraint functions such that equation (1) below is satisfied.

$$C(x+\Delta x)=0. \qquad (1)$$

This is typically accomplished using Newton's method and multiple Gauss-Seidel iterations, where each constraint is solved in serial. In order to support parallel execution, constraints may first be batched into independent sets where each constraint in a set can be safely solved independently. However, this batching requires additional synchronization between each set, and offers reduced parallelism in tailing sets. To increase parallelism, constraints may be solved in a Jacobi fashion. Unfortunately, Jacobi iteration is not guaranteed to converge if the system matrix is not symmetric positive definite (SPD).

Figure 7:
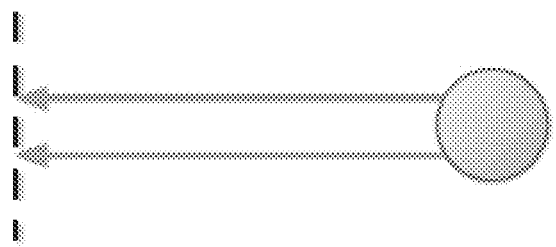
FIG. 7 illustrates a common constraint configuration where using a Jacobi iteration will not converge to a solution.

FIG. 7 illustrates a common constraint configuration where using a Jacobi iteration will not converge to a solution. FIG. 7 illustrates a 1-dimensional particle constrained to the origin by two distance constraints such that $C_i = x$ for both. The system that needs to be solved can be written as follows:

$$\begin{bmatrix} \Delta C_1 \\ \Delta C_1 \end{bmatrix} \begin{bmatrix} \Delta C_1 & \Delta C_2 \end{bmatrix} \begin{bmatrix} \lambda_1 \\ \lambda_2 \end{bmatrix} = \begin{bmatrix} -C_1 \\ -C_2 \end{bmatrix} \qquad (2)$$

Because the constraints are identical, the system matrix is rank deficient, and although Gauss-Seidel iteration would find a solution, a Jacobi iteration would oscillate between two fixed solution indefinitely (the positive and negative side of the origin).

One solution to this problem is to perform constraint averaging, or mass-splitting. Accordingly, in one embodiment, the constraint solver of the present invention processes each constraint in parallel and accumulates position deltas for each particle. Once all constraints are processed, each particle's total constraint delta is divided by the number of constraints affecting it, as given by the following equation:

$$\Delta x_i = \frac{1}{n} \sum_n \lambda_i \Delta C_i. \quad (3)$$

While averaging constraint forces as described by equation 3 guarantees convergence, it also slows convergence significantly. In many cases this averaging is more aggressive than necessary, and so a user-parameter ω is introduced, which controls the rate of successive over-relaxation (SOR), as shown by the following equation:

$$\Delta x_i = \frac{\omega}{n} \sum_n \lambda_i \Delta C_i. \quad (4)$$

Convergence is still guaranteed for 0<ω<2 (provided the system matrix is SPD) and may be set higher based on the scene being simulated.

FIG. 8A illustrates an exemplary procedure for solving constraints in a particle-centric way in accordance with embodiments of the present invention. In the particle centric approach of FIG. 8A, first, a thread is assigned per-particle. For each particle, the procedure then loops over all the constraints affecting it to determine the accumulated position delta for the particle. Finally, a single write operation is performed per-particle once all the constraints are processed.

FIG. 8B illustrates an exemplary procedure for solving constraints in a constraint-centric manner in accordance with embodiments of the present invention. In the constraint-centric procedure, each constraint is assigned its own thread. For each constraint, the procedure loops over all the particles and uses atomic operations to scatter position deltas to each affected particle.

In one embodiment of the present invention, a mixture of particle-centric and constraint-centric procedures can be used depending on the constraint type. For example, fluid density constraints are solved in a particle centric manner, and distance constraints are solved in a constraint centric manner FIG. 9 illustrates an exemplary procedure for a unified solver to simulate visual effects using particles as building blocks in accordance with embodiments of the invention. Each stage of the procedure illustrated in FIG. 9 can, in one embodiment, be executed in parallel on a GPU typically with a single thread per particle.

The procedure illustrated in FIG. 9 can be divided into four different stages. At stage 902, the new velocities and positions of all the particles in the system are predicted based on external forces applied to the particles in the system. Next at stage 904, neighboring particles are found for each of the particles in the system.

At stage 906, the procedure iterates over a plurality of constraints, e.g., density constraints, rigid constraints, distance constraints, pressure constraints, and contact constraints and solves each of the constraints for all particles in parallel. In other words, all constraints of a particular type are solved across all particles in parallel, typically by one or more GPUs, regardless of the type of object or material the particle is being used to model. For example, density constraints at step 10 for all particles in the system are solved in parallel before rigid constraints at step 11. Typically, each step in stage 906 would be executed in parallel on the GPU with 1 thread per particle, or 1 thread per constraint, as desired. It should be noted that that the constraints illustrated within stage 906 are not the only type of constraints that can be solved for as part of the procedure.

Finally, at stage 908, the velocities and positions are updated for each of the particles. Further, velocity level forces such as viscosity and friction are applied to the particles. It will be appreciated that the positions and velocities for the particles can be further adjusted to achieve other simulated properties, effects, and/or phenomena e.g. vorticity confinement, viscosity, etc. as disclosed in U.S. patent application Ser. No. 14/102,323, filed Dec. 10, 2013, entitled "POSITION BASED FLUID DYNAMICS SIMULATION," naming Miles Macklin and Matthias Müller as inventors.

It will be appreciated that the procedure illustrated in FIG. 9 is only one of several ways for a unified solver to simulate visual effects, e.g., rigid bodies, fluids, clothes, etc. using particles as building blocks. Many variations of the procedure illustrated in FIG. 9 are possible that attain the same result.

It should also be noted that the constraints are solved in a parallel Jacobi fashion. As discussed above, in one embodiment, constraint averaging, or mass-splitting, can be performed in order to guarantee convergence. When multiple constraints are acting on a particle, for example, many distance constraints in cloth, it is necessary to divide the resulting change in position by N, wherein N is the number of constraints acting on the particle. By comparison, other unified solvers do not use constraint-averaging or mass splitting to attain convergence.

Collision Detection

In one embodiment, particle to particle interactions are found using discrete overlap tests at the beginning of a time step. If particles move significantly during constraint solving, then subsequent new collisions may be missed. In order to avoid this occurring, in one embodiment, the unified solver of the present invention allows the collision radius to expand by a fixed percentage during the overlap checks.

In one embodiment, particle to shape interactions are also detected using discrete overlap tests at the beginning of the time-step. Again, the particle radius is expanded by a fixed percentage when detecting overlaps to avoid missing collisions during the constraint solve. One exception to this, however, applies in the event of particle to triangle collision detection. Because triangles have no thickness, particles can easily tunnel through the surface if no special care is taken.

In one embodiment of the present invention, the unified solver addresses this by performing continuous collision detection (CCD) against the triangle mesh. As the particles have a finite size, a swept-sphere or capsule-triangle test could be used in one embodiment, however, this is a relatively expensive intersection test.

Rigid Bodies

As discussed above, the unified solver of the present invention, in one embodiment, uses a particle representation to simulate rigid bodies on the GPU. Conventional methods used force based models to simulate rigid bodies. Embodiments of the present invention, by comparison, maintain rigidity using shape matching constraints.

Shapes are sampled, in one embodiment, by voxelizing triangles meshes and generating particles at occupied cells. Because particles in a shape typically overlap, the solver assigns all particles in a shape the same phase identifier and disables collisions between them.

Each shape matching constraint comprises a list of particle indices in the system, their local positions relative to the center of mass in the rest pose, and a stiffness value. In order to ensure particles remain rigid with respect to each other, the solver stores their position in a local coordinate system and then applies the concept of rigid shape-matching at step 12 of the procedure illustrated in FIG. 9 to find the least squares best rigid transform to match the local space positions to the deformed world space positions. In order to allow plastic deformation, in one embodiment, the solver additionally allows some user-configurable amount of deformation to be added back into the local space rest positions.

In one embodiment, small scale deformations for rigid bodies is allowed by the solver through the stiffness parameter of the shape-matching constraint. For larger scale deformation, the solver supports a pressure model based on volume conservation.

Figure 10:
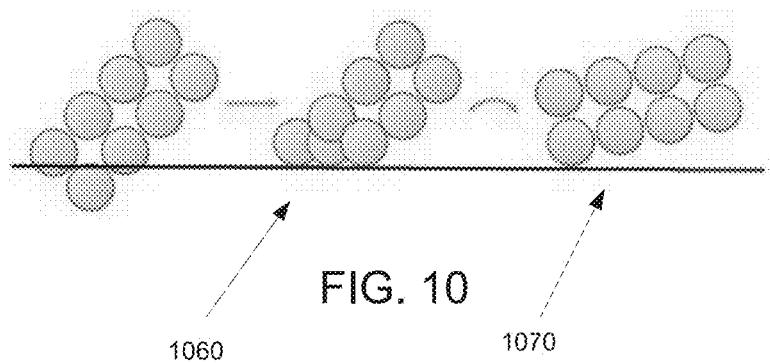
FIG. 10 illustrates how shape matching constraints map deformed particles back to a rigid pose.

FIG. 10 illustrates how shape matching constraints map deformed particles back to a rigid pose. In one embodiment, solving the shape matching constraints requires calculating the least squares best transform from the deformed position 1060 back to the rest pose 1070.

The advantage of this approach is that the solver can collide non-convex shapes by simply considering pairs of overlapping particles. It also provides efficient parallel scaling as the particle representation breaks the scope of the problem down to a smaller granularity.

Stiff Stacks

As mentioned above, stable stacking of rigid bodies is a difficult problem for real-time applications because of the amount of computation required. Jacobi methods, for instance, can only propagate information (collision deltas) over a distance of one-particle per-iteration. Thus, a large number of constraint iterations, e.g. iterations shown in stage 906 of FIG. 9, are required to propagate collision forces from the bottom of a stack to bodies at the top. Accordingly, large stacks of rigid bodies, for example, may require several iterations to appear stiff.

One conventional method of increasing the rate of information propagation is shock propagation. Shock propagation works by iterating bodies from the ground upwards, and fixing each layer of bodies in place after they have been processed. Once a layer is processed it can be given infinite mass, thereby, fixing it in place. The drawback of shock propagation is that the procedure is inherently serial. Layers are processed one at a time in sequential fashion. This is not only inefficient for parallel implementations but also requires a longer computational time. Further, it can make stacks appear unrealistically stable. Because each layer is completely fixed in place once processed, upper layers can no longer have any affect on lower layers.

Embodiments of the present invention provide a more efficient approach to improve the stability of rigid stacks without increasing the number of constraint iterations or changing the iteration order of the constraints. Stated differently, embodiments of the present invention enable the constraint solver to converge to a solution faster than conventional methods. Further, embodiments of the present invention advantageously improve computation time by performing the stack stabilizing procedure efficiently and in parallel.

Generally, embodiments of the invention improve the stability of stacks by making the bottom primitives, e.g., particles, blocks, etc. of the stack relatively heavier than the primitives towards the top of the stack. During the constraint solve the amount a primitive moves is dependent on its mass, the mass modification therefore makes the bottom primitives relatively more resistant to compression and pressure than the top primitives, thereby, increasing the stability of the entire stack.

Figure 11:
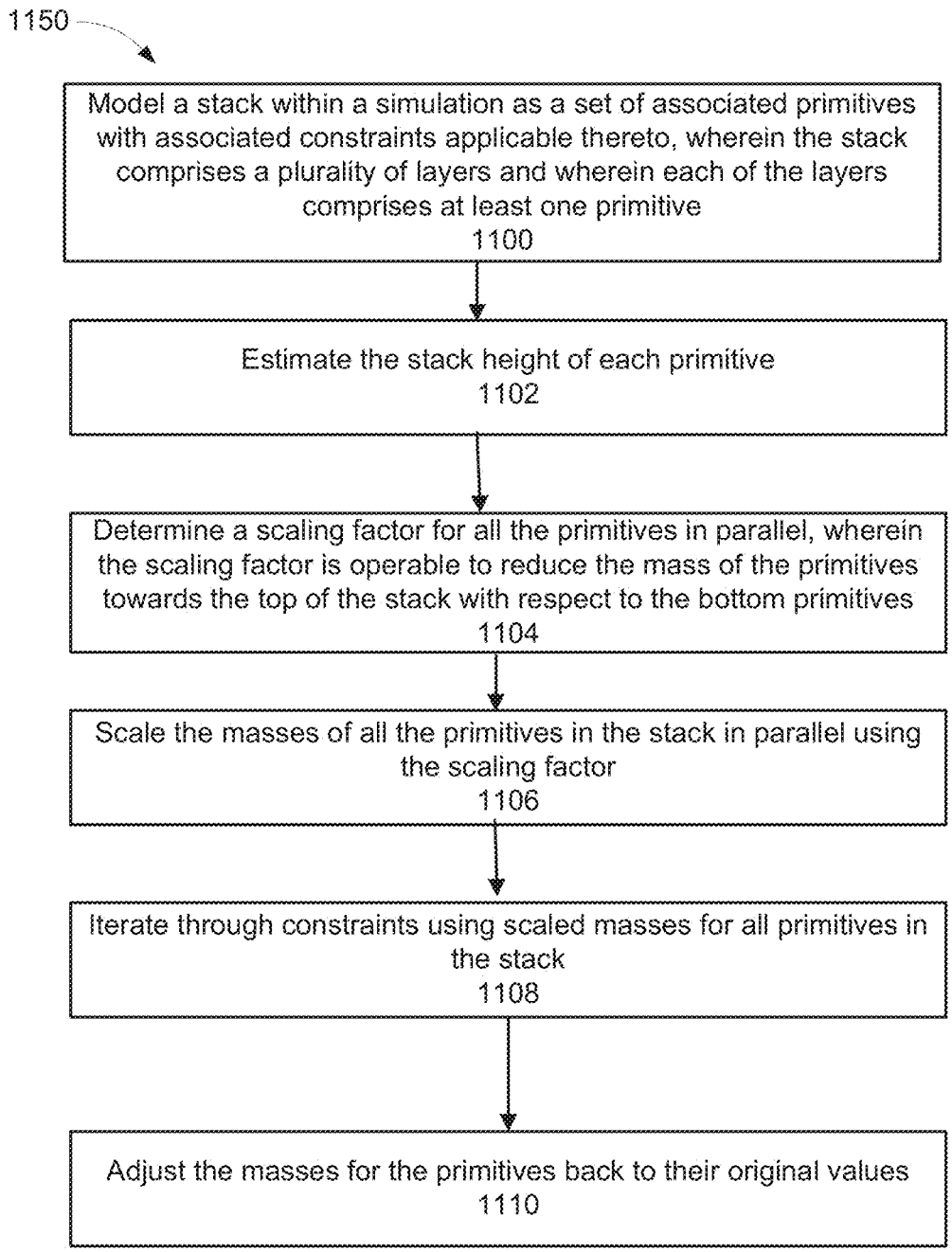
FIG. 11 depicts a flowchart of an exemplary process flowchart of a computer-implemented method of simulating stacks of objects in accordance with embodiments of the present invention.

FIG. 11 depicts a flowchart 1150 of an exemplary process flowchart of a computer-implemented method of simulating stacks of objects in accordance with embodiments of the present invention. The invention, however, is not limited to the description provided by flowchart 1150. Rather, it will be apparent to persons skilled in the relevant art(s) from the teachings provided herein that other functional flows are within the scope and spirit of the present invention.

At block 1100, a stack within a simulation is modeled as a set of associated primitives with associated constraints applicable thereto. Further, each stack comprises a plurality of layers and wherein each of the layers comprises at least one primitive. In one embodiment, a primitive can be a particle. However, embodiments of the present invention are not so limited. A primitive can be any other object, e.g., a block, a triangle mesh etc. as well.

At block 1102, the solver estimates the stack height of each primitive, e.g., a particle. This can be done one of several ways. It can be performed using a parallel graph search from a boundary, e.g., the ground plane, wherein the graph search may be used to count the number of primitives above or below the primitive being evaluated. Alternatively, iteratively propagating a field, e.g., a force field from the boundary into the stack can perform it. Or a simple heuristic such as height from a ground plane can be used.

At block 1104, once the stack height for the primitives has been estimated, a scaling factor is determined to scale the mass of each primitive constituting the stack. The purpose of the scaling factor is so that each of the primitive's mass can be temporarily modified such that the lower primitives have a relatively larger mass than the ones above. For example, if the fundamental building blocks of the stack were particles, the lower particles would have higher masses than the top particles of the stack. Accordingly, the resulting mass ratio causes lower particles to feel less pressure and to resist compression.

The primitives' mass can be altered, in one embodiment, using an exponential function, as seen in Equation 5 below. The exponential function is used to derive a scale factor for the mass of the primitives, wherein $h(x_i)$ is the stack height for a primitive and k is the scaling coefficient.

$$s_i(x_i) = e^{-kh(x_i)} \quad (5)$$

In the case that $h(x_i)$ is equal to the height from the ground plane, then the scaling function provides a constant mass ratio of $s_i/s_j = e^{-kr}$ for two primitives i and j stacked a distance r apart. The scaling function of Equation 6 scales down the mass of primitives further from the ground plane at a higher rate than primitives closer to the ground plane. Accordingly, the primitives with a greater height value will have a lower mass than primitives with a smaller height value. Alternatively, in a different embodiment, the scaling function can be chosen to scale up the mass of the primitives closer to the ground plane as compared to the mass of the primitives further from the ground plane.

At block 1106, the scaled primitive mass is determined for all primitives by multiplying the original mass with the scaling factor, $s_i$. The new mass, $m_i^*$, is given by equation 6 below. Because each primitive is scaled and processed independently, the mass scaling for all primitives can be handled in parallel. In one embodiment, each primitive mass adjustment is handled in a separate thread in a GPU. Where a particle-centric unified solver is used, in one embodiment, the mass scaling is applied at step 3 of the process illustrated in FIG. 9. The mass scaling is applied to all the particles at step 3 before applying the constraints during stage 906. In one embodiment, the solver procedure is programmed with the intelligence to apply the scaling only to certain particles, e.g., particles constituting a stack of rigid bodies.

$$m_i^* = s_i^* m_i \tag{6}$$

At block 1108, the scaled primitive mass is used for constraint solving, e.g., during stage 906 of FIG. 9. The scaled primitive mass is only used during the constraint solving phase and is reset post-constrain solve.

Further, in one embodiment, the temporary mass modification may only need to be applied for the final iteration of constraint solving, e.g., the final iteration of stage 906 of FIG. 9. For example, if the scaling parameter, k, is chosen to have a high value, the bottom particles will end up having too high a mass and, effectively, stop responding to interaction. In this case, mass modification may only need to be applied in the final solver iteration for the solver to converge to the appropriate stack height value.

Finally, at block 1110, after constraint solving, the masses of the primitives are adjusted back to their original values.

It will be appreciated by one of ordinary skill in the art that the afore-described stacking procedure is not limited to a unified solver or to a particle-centric solver. The techniques discussed herein to ensure stack stability in simulations can be applied equally effectively to conventional rigid body solvers, which may use a variety of primitives as their fundamental building blocks, e.g., convex hulls, triangle meshes, etc.

In contrast to conventional methods, the mass modification scheme of the present invention modifies the primitive masses continuously and simultaneously. By comparison, conventional methods processed bodies in discrete layers making them inefficient and incapable of taking advantage of parallel architectures. Further, embodiments of the present invention advantageously allow for varying degrees of mass change so that the stacks being simulated appear to be realistic with the mass of the primitives smoothly increasing towards the ground plane.

Figure 12:
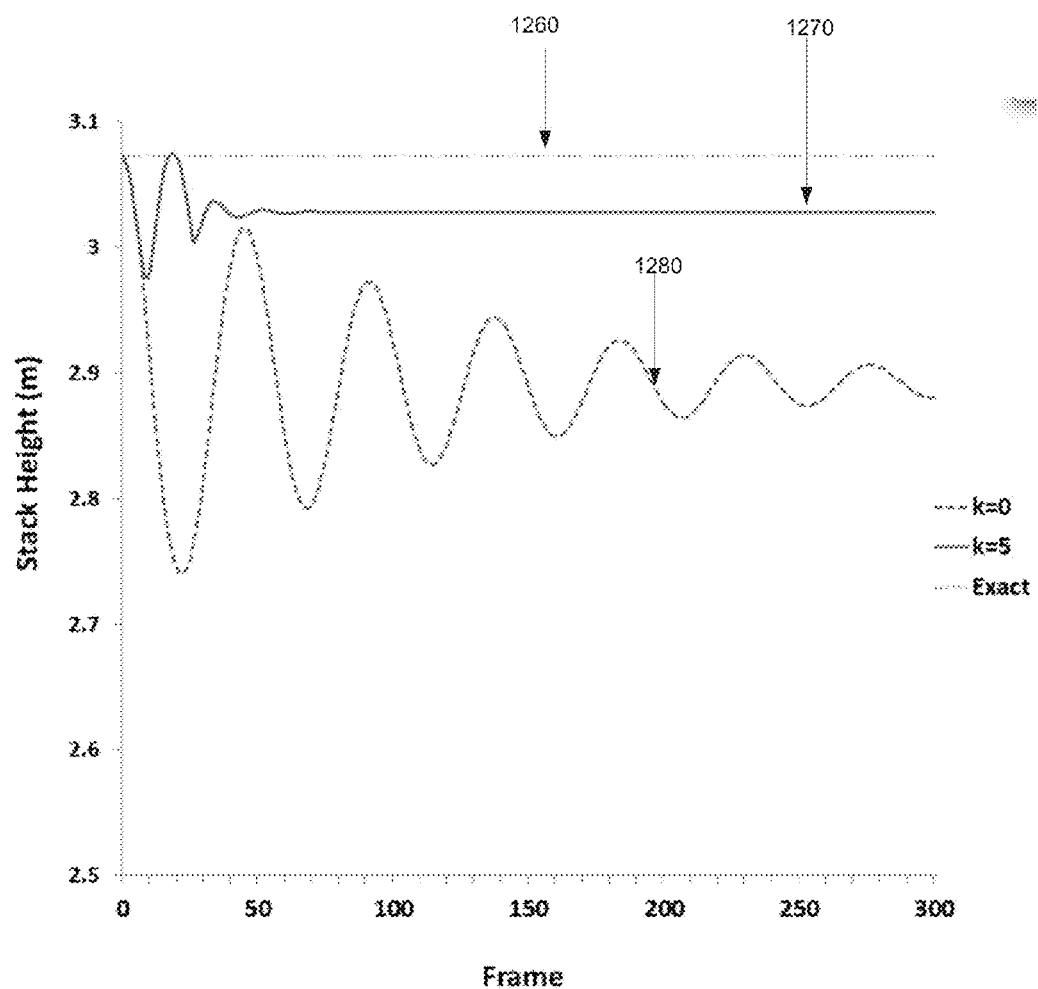
FIG. 12 compares the convergence rates of the constraint solve procedure with and without the mass modification scheme of the present invention.

FIG. 12 compares the convergence rates of the constraint solve procedure with, and without, the mass modification scheme of the present invention. Graph 1260 illustrates the ideal stack height. Typically, if a finite number of constraint iterations are used, the simulated stack height will never reach the ideal stack height because of gravity exerting a downward force on the simulated particles. If, however, the solver were to iterate through the constraints an infinite number of times, the simulated stack height would converge to the ideal stack height. This, obviously, that is impractical.

Graph 1280 illustrates a stack of rigid bodies converging to rest by iterating through constraints without mass modification. As shown in FIG. 12, graph 1280 oscillates for a long time before converging to a final value and also shows significant compression. Graph 1290 illustrates a stack of rigid bodies converging to rest by iterating through constraints with the mass modification of the present invention applied. As shown by graph 1290, the stack stabilizes relatively quickly compared to graph 1280 and also comes closer to the true solution, which in this case is the ideal stack height.

Figure 13A:
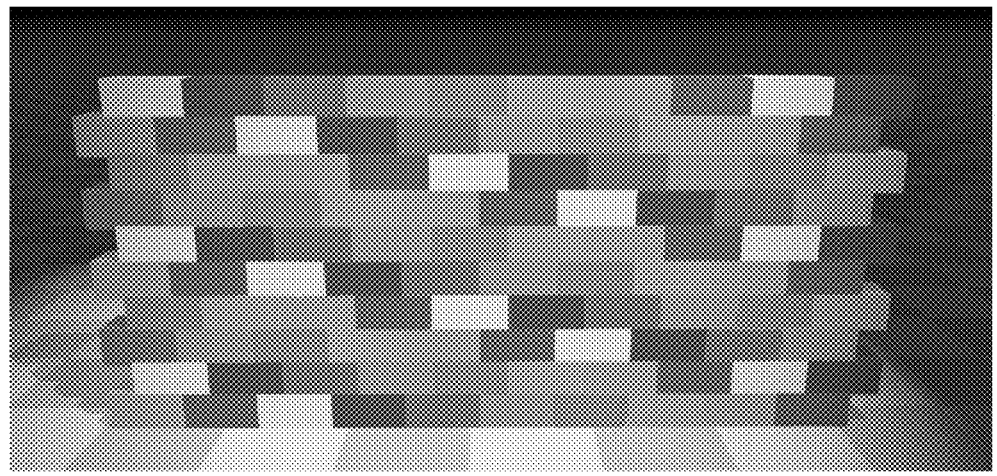
FIG. 13A illustrates an exemplary wall of densely stacked rigid bodies.
Figure 13B:
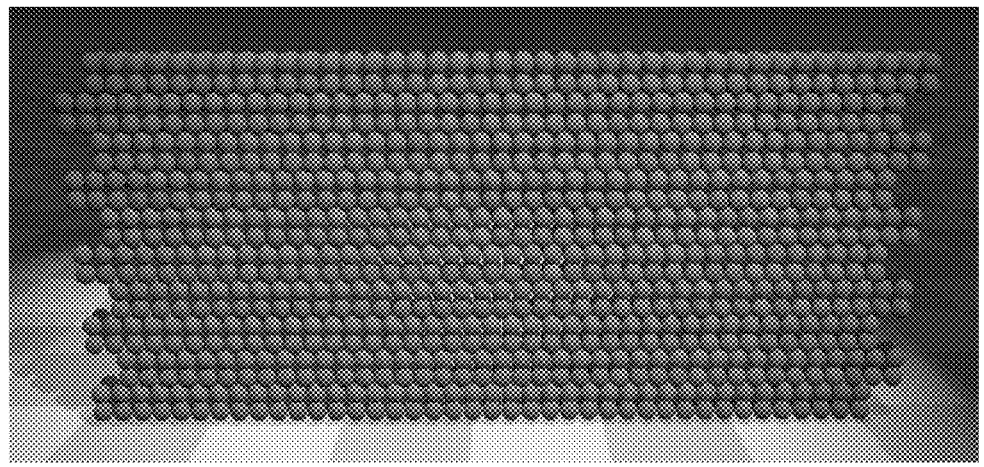
FIG. 13B illustrates a particle view of the wall of FIG. 13A with a smoothly increasing mass towards the ground as a result of the mass modification scheme in accordance with one embodiment of the present invention.
Figure 14A:
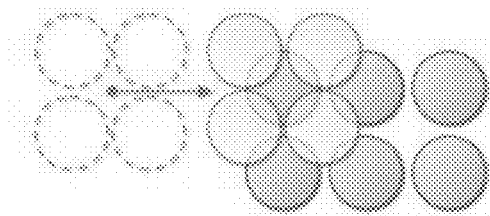
FIG. 14A illustrates the manner in which rigid groups of particles can interpenetrate and become locked together due to discrete collisions.
Figure 14B:
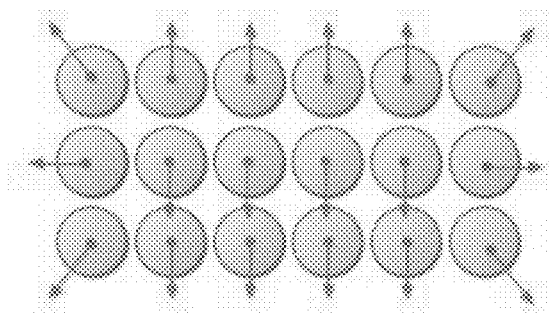
FIG. 14B illustrates the manner in which the solver stores a directional field per particle to prevent rigid interpenetration and locking in accordance with an embodiment of the invention.
Figure 15:
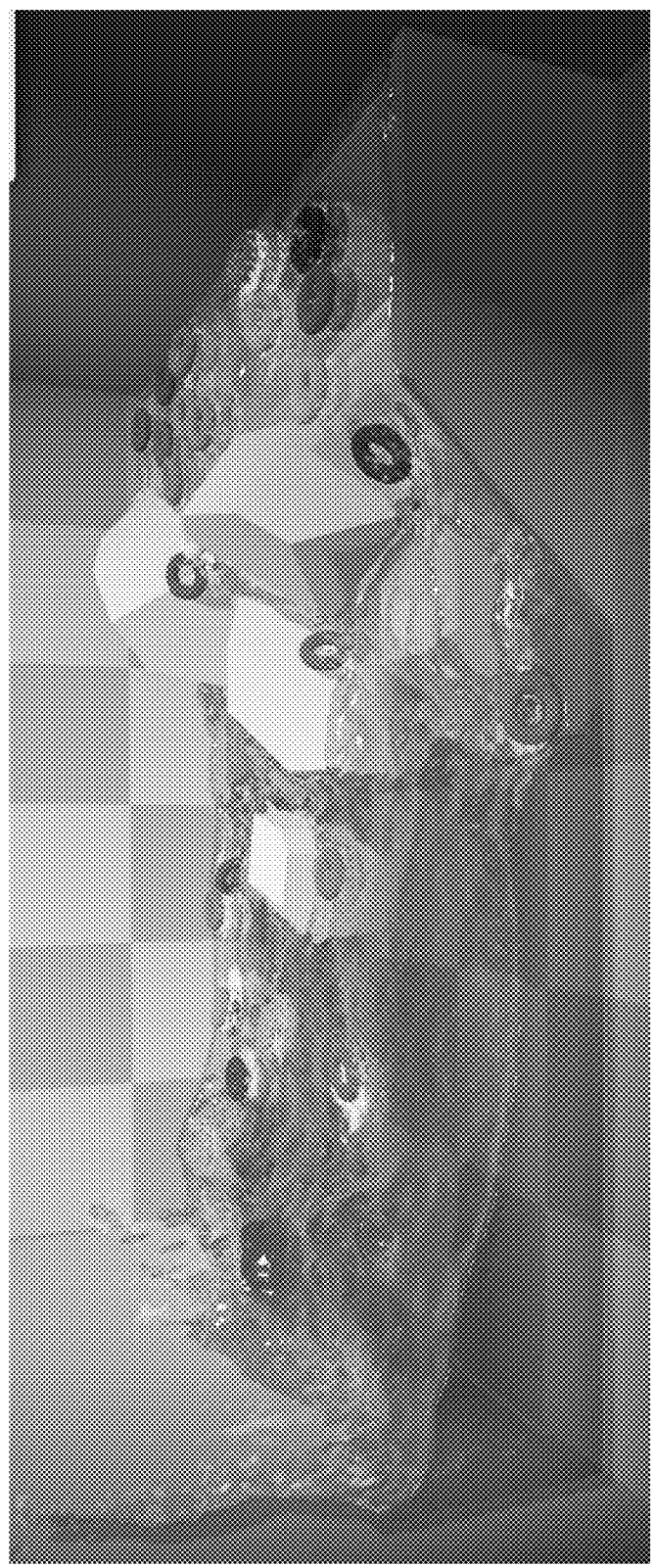
FIG. 15 illustrates the manner in which assigning particles different masses gives rise to buoyancy in accordance with embodiments of the invention.

FIG. 13A illustrates an exemplary wall of densely stacked rigid bodies. FIG. 13B illustrates a particle view of the wall of FIG. 13A with a smoothly increasing mass towards the ground as a result of the mass modification scheme in accordance with one embodiment of the present invention. As a result of the mass modification procedure, the wall illustrated in FIG. 13B reaches stability more efficiently and with a relatively few number of constraint iterations. Further, as a result of mass modification, the height of the wall illustrated in FIG. 13B will converge to a value that is closer to the true height of the wall than without the modification scheme. Finally, using an exponential scaling function, e.g., Equation 5 allows the mass of the particles to increase smoothly towards the ground.

Interpenetration of Particles

It is possible for particles to pass through each other and for shapes to become interlocked because the solver is based on discrete collision checks. FIG. 13A illustrates the manner in which rigid groups of particles can interpenetrate and become locked together due to discrete collisions.

FIG. 13B illustrates the manner in which the solver stores a directional field per particle to prevent rigid interpenetration and locking in accordance with an embodiment of the invention. As shown in FIG. 13B, in order to address this issue, the solver stores a vector for each particle that represents the direction of minimum translation required to resolve the collision when particles collide. Alternatively, if the shape's particle sampling is generated from a signed distance field, the field's gradient direction can be used. This can be viewed as a sparse sampling of the shape's collision function stored on the particles. Because this field is invalidated under deformation, the solver uses the deformation gradient calculated during shape-matching to approximately deform the vector field accordingly.

Fluids

Fluids are simulated by the solver of the present invention using the method disclosed in U.S. patent application Ser. No. 14/102,323, filed Dec. 10, 2013, entitled "POSITION BASED FLUID DYNAMICS SIMULATION," naming Miles Macklin and Matthias Müller as inventors, and wherein the fluid density constraint is considered as another constraint in the system.

In one embodiment, to allow fluids and other types of particles to interact, the solver includes non-fluid particles (particles with a phase identifier >0) in the density estimate for fluid particles. The solver then initializes density at a non-fluid particle to be equal to the rest density, which ensures fluid particles are separated from the non-fluid particles. Stated differently, the solver supports solid and fluid interactions by letting solid particles participate in the fluid density estimation. Then, if two particles are overlapping and at least one is a solid particle, both are treated as solid particles with the fluid rest distance used as the contact distance.

Different density ratios can be incorporated into the position based fluids method by weighting constraint deltas by the particle inverse mass $w_i = 1/m_i$ as shown below:

$$\Delta p_i = -w_i \lambda \nabla_{p_i} C(p_1 \ldots p_n) \tag{7}$$

$\lambda$, as given by equation 8 below, includes the sum of weights in the denominator.

$$\lambda = -\frac{C(p_1, \ldots, p_n)}{\sum_i w_i |\nabla p_k C(p_1 \ldots p_n)|^2}. \tag{8}$$

This automatically gives rise to buoyancy and sinking of objects with differing mass ratios. FIG. 13 illustrates the manner in which assigning particles different masses gives rise to buoyancy in accordance with embodiments of the invention.

In one embodiment, the stable stacking procedure of the present invention, discussed above, can also be applied to fluid particles in the simulation.

Granular Materials

Figure 16:
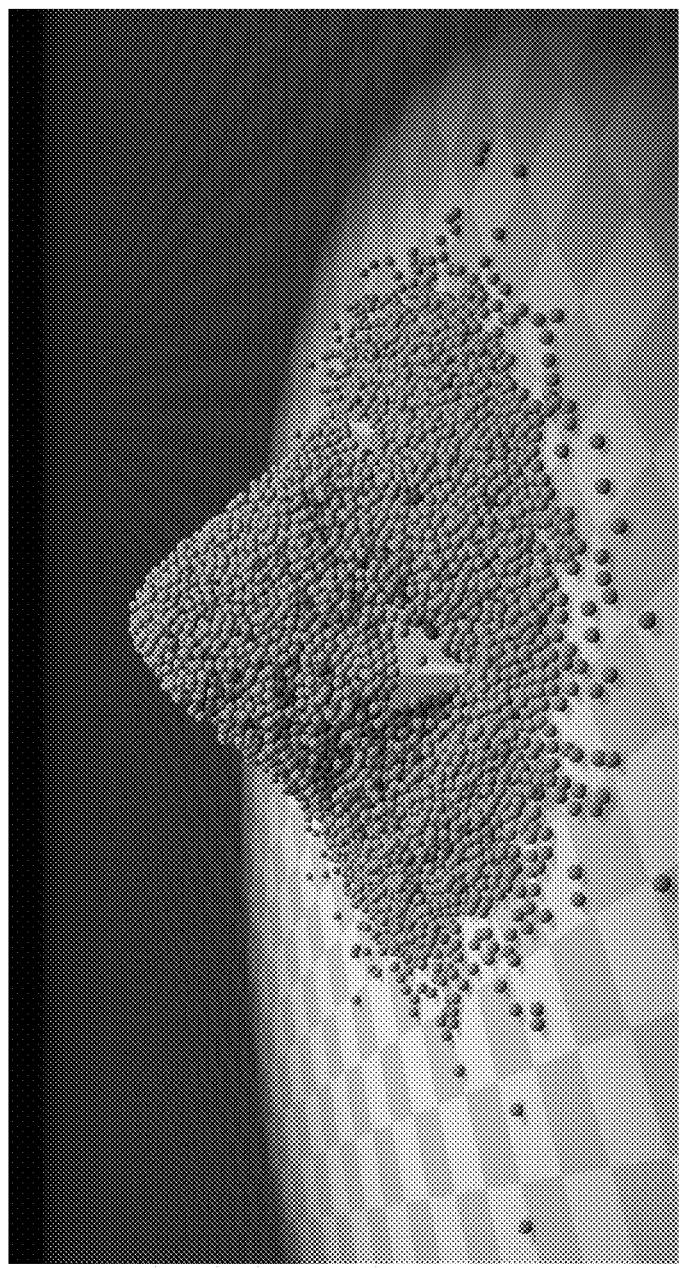
FIG. 16 illustrates particles forming a heap with a high angle of repose in accordance with embodiments of the invention.

FIG. 16 illustrates particles forming a heap with a high angle of repose in accordance with embodiments of the invention. The solver treats particles as rigid spheres and applies an iterative position based friction model, as discussed above, and aggressive particle sleeping, also discussed above, to form large piles of particles with high angles of repose.

Materials like sand are highly dissipative, so to accelerate settling and to encourage heap formulation, an additional dissipation term is introduced based on the particle neighbor count, c. This dissipation term is designed to model the dissipation chains that exist in real world granular materials. After the position solve, the velocity is scaled in accordance with equation 9 below:

$$v_i = v_i * \max(0, 1-\gamma c), \quad (9)$$

wherein γ is a user parameter constant for the scene.

In one embodiment, the stable stacking procedure of the present invention, discussed above, can also be applied to granular particles in the simulation, e.g., in order to stabilize the heap of particles illustrated in FIG. 16.

Figure 17:
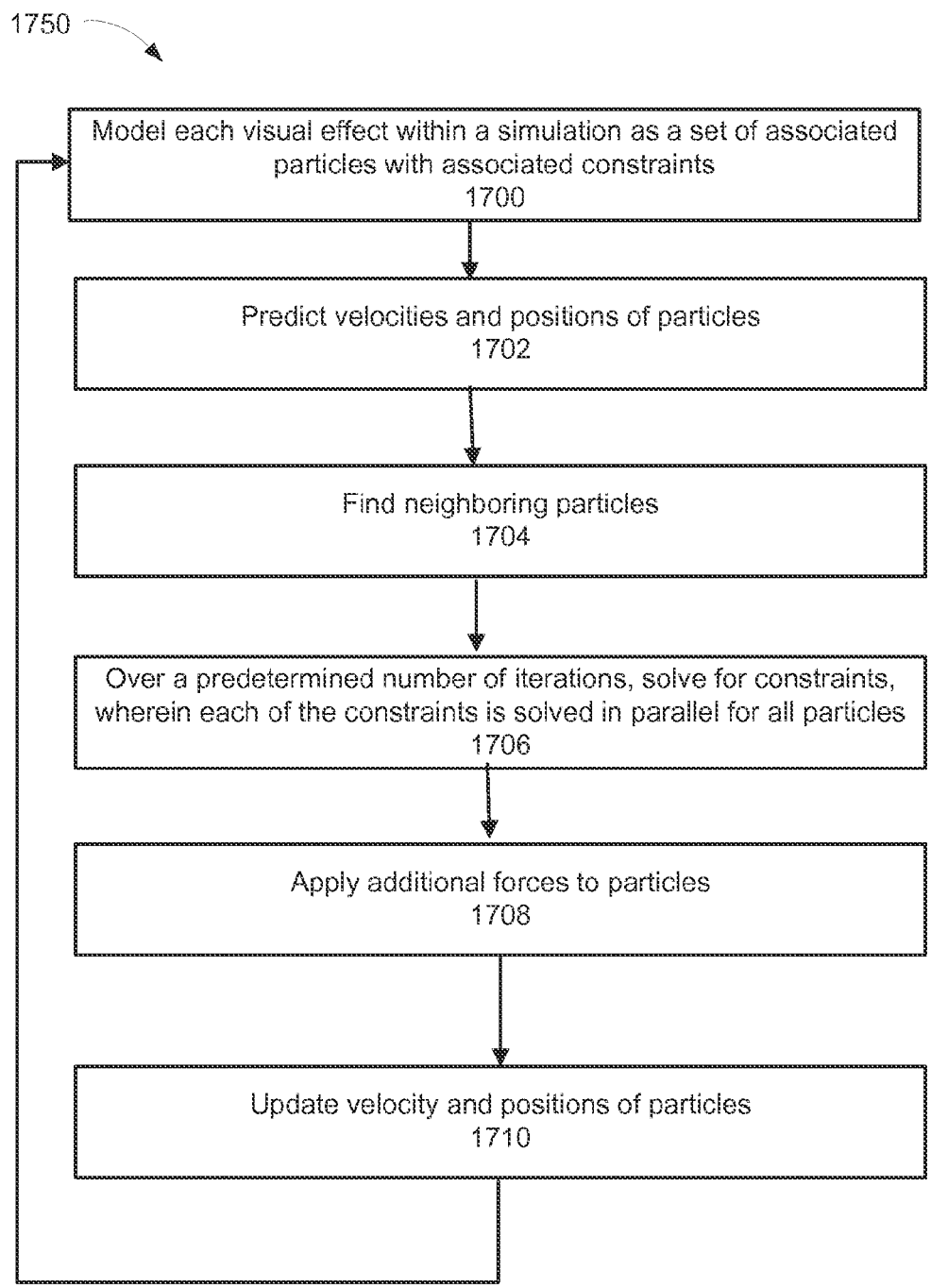
FIG. 17 depicts a flowchart of an exemplary process flowchart of a computer-implemented method of simulating visual effects in accordance with embodiments of the invention.

FIG. 17 depicts a flowchart 1750 of an exemplary process flowchart of a computer-implemented method of simulating visual effects in accordance with embodiments of the present invention. The invention, however, is not limited to the description provided by flowchart 1750. Rather, it will be apparent to persons skilled in the relevant art(s) from the teachings provided herein that other functional flows are within the scope and spirit of the present invention.

At block 1700, each visual effect is modeled within a simulation as a set of associated particles with associated constraints applicable thereto.

At block 1702, the new velocities and positions of the particles in the system are predicted as discussed in connection with stage 902 of FIG. 9.

At block 1704, neighboring particles are found for each of the particles in the system as discussed in connection with stage 904 of FIG. 9.

At block 1706, as discussed in connected with stage 906 of FIG. 9, the solver iterates over a plurality of constraints, e.g., density constraints, rigid constraints, distance constraints, pressure constraints, and contact constraints and solves each of the constraints for all particles in parallel typically by GPUs. In other words, all constraints of a particular type are solved across all particles in parallel regardless of the type of object or material the particles are being used to model. For example, density constraints at step 10 of FIG. 9 for all particles in the system are solved in parallel before rigid constraints at step 11. Typically, each step in stage 906 of FIG. 9, for example, would be executed in parallel on the GPU with 1 thread per particle.

At block 1708, velocity level forces such as viscosity and friction are applied to the particles.

Finally at block 1710, the velocities and positions are updated for each of the particles. Subsequently, this sequence of steps can be repeated for other particles or can be repeated for the same particles in response to a new force applied to the particles.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A computer implemented method of simulating a stack of objects represented as data within memory of a computer system, said method comprising:
    modeling said stack within a computer simulation as a set of associated primitives with associated constraints thereto in said memory, wherein said stack comprises a plurality of layers and wherein each layer comprises at least one primitive;
    estimating a height for each of a plurality of primitives in said stack;
    determining a respective scaling factor for each of said plurality of primitives in parallel, wherein each scaling factor is operable to adjust a mass value of each of said plurality of primitives;

scaling a mass value of each of said plurality of primitives in accordance with a respective scaling factor in parallel; and solving over a plurality of constraints iteratively using a scaled mass value for each of said plurality of primitives.

2. The computer implemented method of claim 1, further comprising:
resetting a mass value for each of said plurality of primitives to a respective value prior to said scaling.

3. The computer implemented method of claim 1, wherein said scaling further comprises decreasing a mass value of primitives comprising upper layers of said stack relative to bottom layers of said stack, wherein said decreasing is performed in accordance with a respective scaling factor.

4. The computer implemented method of claim 1, wherein said determining and said scaling are performed in parallel on a graphics processing unit (GPU), and wherein each of said plurality of primitives is scaled in a discrete thread on said GPU.

5. The computer implemented method of claim 1, wherein a primitive from said plurality of primitives is selected from a group consisting of:
a particle, a convex hull, and a triangle mesh.

6. The computer implemented method of claim 1, wherein said estimating comprises using a procedure to estimate said height and said procedure is selected from a group consisting of: using a parallel graph search, propagating a force field from a boundary, and using a distance from a ground plane.

7. The computer implemented method of claim 1 wherein said scaling factor is determined using a scaling function, wherein a type of said scaling function is selected from a group consisting of: a non-linear function, an exponential function and a logarithmic function.

8. The method of claim 1, further comprising using said stack to simulate a visual effect wherein said visual effect is selected from a group consisting of: rigid bodies, fluids, and granular materials.

9. A non-transitory computer-readable storage medium having stored thereon, computer executable instructions that, if executed by a computer system cause the computer system to perform a method of simulating a stack of objects represented within memory of a computer system, said method comprising:
modeling said stack within a computer simulation as a set of associated primitives with associated constraints thereto in said memory, wherein said stack comprises a plurality of layers and wherein each layer comprises at least one primitive;
estimating a height for each of a plurality of primitives in said stack;
determining a respective scaling factor for each of said plurality of primitives in parallel, wherein each scaling factor is operable to adjust a mass value of each of said plurality of primitives;
scaling a mass value of each of said plurality of primitives in accordance with a respective scaling factor in parallel; and
solving over a plurality of constraints iteratively using a scaled mass value for each of said plurality of primitives.

10. The computer-readable medium as described in claim 9, further comprising:
resetting a mass value for each of said plurality of primitives to a respective value prior to said scaling.

11. The computer-readable medium as described in claim 9, wherein said scaling further comprises decreasing a mass value of primitives comprising upper layers of said stack relative to bottom layers of said stack, wherein said decreasing is performed in accordance with a respective scaling factor.

12. The computer-readable medium as described in claim 9, wherein said determining and said scaling are performed in parallel on a graphics processing unit (GPU), and wherein each of said plurality of primitives is scaled in a discrete thread on said GPU.

13. The computer-readable medium as described in claim 9, wherein a primitive from said plurality of primitives is selected from a group consisting of: a particle, a convex hull, and a triangle mesh.

14. The computer-readable medium as described in claim 9, wherein said estimating comprises using a procedure to estimate said height and said procedure is selected from a group consisting of: using a parallel graph search, propagating a force field from a boundary, and using a distance from a ground plane.

15. The computer-readable medium as described in claim 9, wherein said scaling factor is determined using a scaling function, wherein a type of said scaling function is selected from a group consisting of: a non-linear function, an exponential function and a logarithmic function.

16. The computer-readable medium as described in claim 9, further comprising using said stack to simulate a visual effect wherein said visual effect is selected from a group consisting of: rigid bodies, fluids, and granular materials.

17. A system for simulating a stack of objects, said system comprising:
a memory storing information related to a constraint solver;
a processor coupled to said memory, said processor operable to implement a method of simulating a stack of objects, said method comprising:
modeling said stack within a computer simulation as a set of associated primitives with associated constraints thereto in said memory, wherein said stack comprises a plurality of layers and wherein each layer comprises at least one primitive;
estimating a height for each of a plurality of primitives in said stack;
determining a respective scaling factor for each of said plurality of primitives in parallel, wherein each scaling factor is operable to adjust a mass value of each of said plurality of primitives;
scaling a mass value of each of said plurality of primitives in accordance with a respective scaling factor in parallel; and
solving over a plurality of constraints iteratively using a scaled mass value for each of said plurality of primitives.

18. The system of claim 17, further comprising:
resetting a mass value for each of said plurality of primitives to a respective value prior to said scaling.

19. The system of claim 17, wherein said scaling further comprises decreasing a mass value of primitives comprising upper layers of said stack relative to bottom layers of said stack, wherein said decreasing is performed in accordance with a respective scaling factor.

20. The system of claim 17, wherein said determining and said scaling are performed in parallel on a graphics processing unit (GPU), and wherein each of said plurality of primitives is scaled in a discrete thread on said GPU.

* * * * *